Aug. 19, 1958
W. C. IRVINE
2,848,125
ATTACHMENT FOR TRACTOR MOUNTED FRONT END
LOADER OPERABLE BY TRACTOR MOVEMENT
Filed June 24, 1957
2 Sheets-Sheet 1
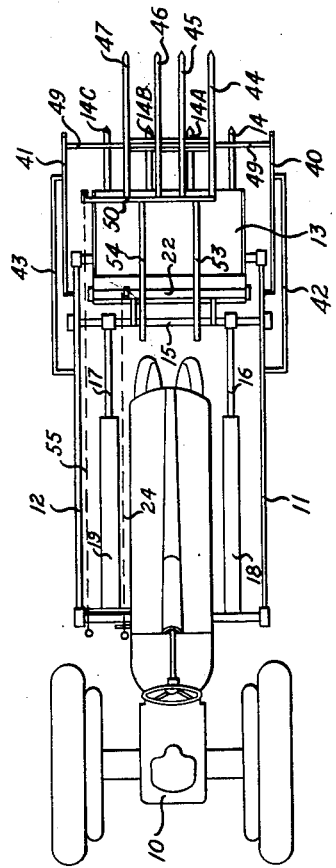
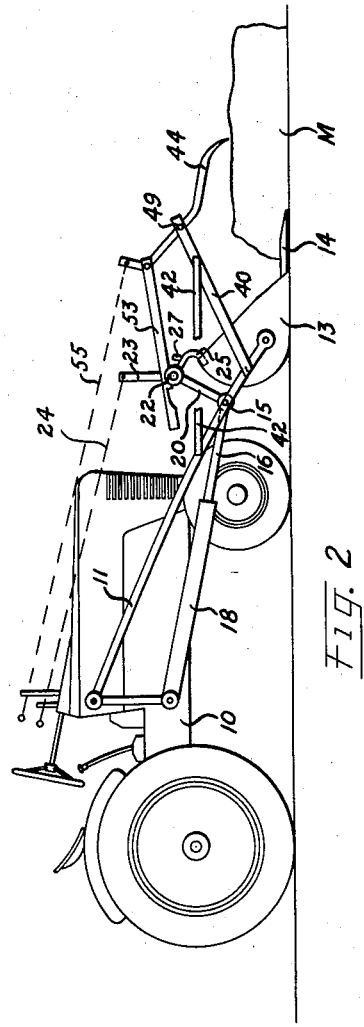
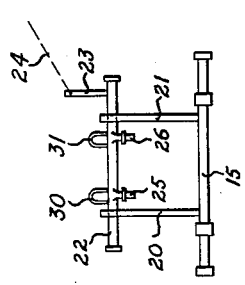
INVENTOR
WILLIAM C. IRVINE
BY
W. E. Sherwood
ATTORNEY Aug. 19, 1958 W. C. IRVINE 2,848,125
ATTACHMENT FOR TRACTOR MOUNTED FRONT END
LOADER OPERABLE BY TRACTOR MOVEMENT
Filed June 24, 1957 2 Sheets-Sheet 2

INVENTOR
WILLIAM C. IRVINE

BY W. E. Sherwood

ATTORNEY

United States Patent Office 2,848,125
Patented Aug. 19, 1958

2,848,125

ATTACHMENT FOR TRACTOR MOUNTED FRONT END LOADER OPERABLE BY TRACTOR MOVEMENT

William C. Irvine, Danville, Ky., assignor of one-third to David B. Highbaugh, Danville, Ky.

Application June 24, 1957, Serial No. 667,508

8 Claims. (Cl. 214—144)

This invention relates to an improved attachment for tractor mounted front end loaders and to the tractor assembly equipped therewith. In particular, it relates to an attachment whose functioning is dependent upon movement of the tractor and which is especially adapted for the loading of materials, such as manure, which are difficult to segregate into quantities which are readily loaded. As is known, during winter months large quantities of manure, which is mixed with hay or straw, is often permitted to accumulate in barns and is later loaded into manure spreaders for use as a fertilizer in the field. A large quantity of such a matted, heavy material is difficult to load into conventional tractor loading buckets. Various devices, such as hydraulically operated rakes and the like, have been proposed for use in breaking away portions of the larger quantity and for moving the same into the tractor bucket. All such devices, however, of which I am aware, have had one or more disadvantages which it is a purpose of my invention to overcome.

An object of my invention is to provide an improved attachment for conventional tractor mounted loaders which is inexpensive; readily mounted upon or dismounted from the loader; capable of being installed and operated by unskilled operators; and operable with a relatively small amount of physical exertion.

Another object is to provide an improved manure-loading attachment for tractor mounted loaders which is self-embedding in the material under the influence of advancing tractor movement.

Another object is to provide an improved manure-loading attachment for tractor mounted loaders which is self-locking in the material under the influence of advancing tractor movement and which remains in locked position and serves to separate the material while under the influence of retracting tractor movement.

A further object is to provide an improved manure-loading attachment for tractor mounted loaders having a reinforced, counter-balanced movable grapple.

Other objects and advantages will become apparent as the description proceeds and when considered in conjunction with the accompanying drawings in which:

Fig. 1 is a plan view of the tractor mounted front end loader equipped with the manure-loading attachment;

Fig. 2 is a side elevation view of the assembly of Fig. 1 showing the apparatus at the beginning of a loading operation;

Fig. 5 is a front view of the cross beam and cooperating elements but with the bucket and piston rods removed;

Figures 3, 4:
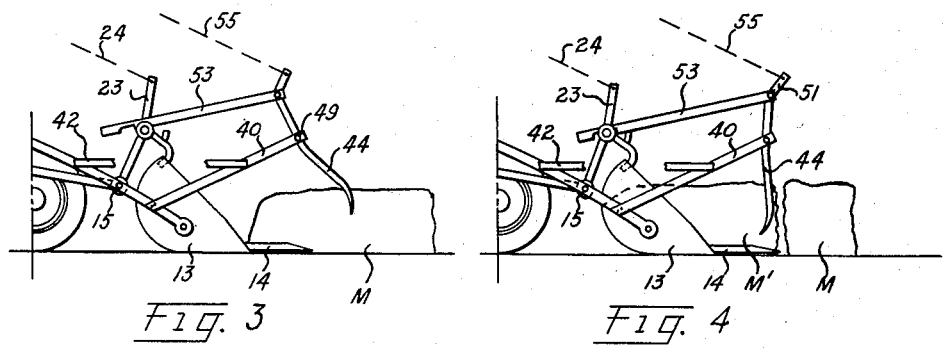
Fig. 3 is a partial side elevation view similar to Fig. 2 and showing the apparatus at an intermediate stage of a bucket-loading operation and with the tractor advancing.
Fig. 4 is a partial side elevation view similar to Fig. 2 and showing the apparatus with the bucket in loaded condition and with the tractor retracting.

In accordance with the invention, I provide a demountable framework for mounting upon the pivoted bucket lifting beams of the loader without requiring modification of the tractor or of the loader for that tractor. This framework in turn serves to mount a sturdy grapple member having latching means, as well as manual actuating means for positioning the grapple in ready position. The grapple is counter-balanced and transversely reinforced and preferably cooperates with tines mounted on the loader bucket. Upon forward movement of the tractor, the grapple embeds itself in the material and then automatically locks itself, while upon rearward movement of the tractor the grapple remains locked and serves to segregate the filled bucket of material from the remaining mass of material.

Referring now to Figs. 1 and 2, a conventional tractor 10, suitable for use with the invention, has mounted thereon a pair of transversely spaced longitudinal beams 11 and 12 pivoted at one end upon the tractor body and pivotally attached at their second end to to a conventional scoop-type bucket 13 provided with spaced tines 14, 14A, 14B and 14C projecting forwardly thereof. Adjacent the rear of the bucket, but spaced sufficiently far therefrom to permit bucket rotation, is a lifting cross beam 15 having swivelled housings thereon from which project piston rods 16 and 17 cooperating with cylinders 18 and 19 which, in turn, are swivelled upon the tractor body and receive a pressure fluid from a suitable source, not shown, for extension and retraction of the piston rods under suitable control means, all as known in the art.

Rigidly mounted upon cross beam 15, as seen in Fig. 5, is a pair of arms 20 and 21 in which is rotatably journally a rocking shaft 22 for tripping and for engaging the rear wall of bucket 13. Rigidly fixed to one end of the rocking shaft is an arm 23 having a cable 24 or other suitable means extending to an operating position adjacent the operator's seat on the tractor. Also rigidly affixed to the rocking shaft inboard of the arms 20 and 21 is a pair of curved latches 25 and 26, the free ends of which are adapted to engage and hold the back wall of bucket 13 with the rocking shaft fully moved to its holding position and with the bucket resting on the ground and which are adapted to move out of contact with the bucket when the shaft is fully moved to its releasing position by operation of cable 24. On their upper surfaces, these latches are provided with locking bar releases 27 and 28, for a purpose later to appear. Extending upwardly from the rocking shaft above the latches is a pair of guide hoops 30 and 31 rigidly affixed to the rocking shaft. The weight of the latches is such as to bias the rocking shaft in a clockwise direction, as viewed in Fig. 2, and to drop the latches into engagement with the bucket when tension is released upon cable 24.

Figure 7:
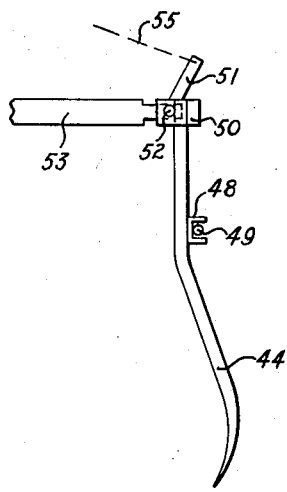
Fig. 7 is a side elevation view of the grapple detached from its mounting framework and to a larger scale.
Figure 8:
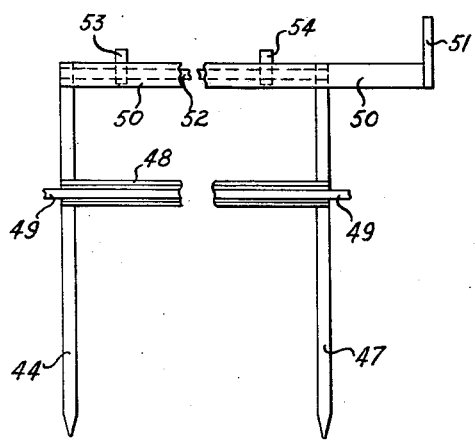
Fig. 8 is a front elevation view of portions of the grapple shown in Fig. 7.

By means of the structure, as thus described, the bucket 13 may be employed for loading of many different materials in a conventional manner, and as such, forms no novel part of the present invention. However, I am enabled to employ this conventional apparatus for the loading of manure and other materials difficult to load, by providing the improved attachment, now to be described. Upon the longitudinal beams I mount a rigid framework comprising members 40 and 41 attached at one end to the respective beams 11 and 12 and braced by suitable truss members 42 and 43. The members 40 and 41 extend to a point forwardly and upwardly of the outer ends of the beams and preferably the entire framework is detachably mounted upon the loader as by means of bolts, not shown, although, if desired, it can be fixedly mounted as by welding. Between the spaced forward ends of the members 40 and 41, a reinforced grapple is rockably mounted and serves further to brace the framework transversely. This grapple, as best seen in Figs. 7 and 8, comprises a plurality of massive tines 44, 45, 46 and 47 having pointed lower ends adapted to be embedded in the material and preferably having a slight curvature, as shown along those lower ends. The tines are transversely reinforced by means of a central member 48, which conveniently may comprise an open channel member to the back wall of which each tine is securely welded and on the front wall of which an elongated rod 49 is securely welded with each of its ends projecting beyond the central member. At the extreme upper end each tine is securely welded to a second transverse member 50, one end of which projects to one side of the grapple and has an arm 51 rigidly secured thereto. Transverse member 50 also carries a rod 52 upon which elongated locking members 53 and 54 are rotatably pivoted at their forward ends.

In accordance with the invention, the grapple is mounted upon the framework by means of rod 49 whose ends are suitably journalled in the members 40 and 41 and with the axis of that rod being parallel to the axis about which bucket 13 is mounted. In addition, the location of rod 49 is such as to provide a substantial counter-balancing of the weight of the grapple and its attachments, but permitting the same to move normally into material engaging position when tension is released upon a cable 55 attached to one end of arm 51 and extending to a location adjacent the operator's station on the tractor. Thus, the grapple is biased to fall into a position wherein its tines cooperate with the tines on the bucket to engage material therebetween, but requires little effort on the part of the operator to raise the grapple into the starting position, as seen in Fig. 2. It will be understood that when extreme depths of a layer of material are to be handled, the cable 55 may be actuated in cooperation with intermediate pulleys, toggles, or the like, interposed between the arm 51 and the operator's station in order to lift the grapple to a height sufficient to engage the top of the layer of material.

Figure 6:
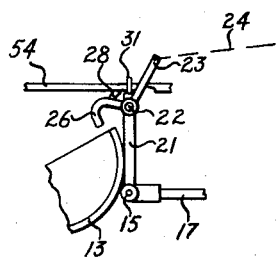
Fig. 6 is a detail view showing the combined actuation of the bucket-latches and locking bar releases.

Considering now Figs. 5, 6 and 7, each of locking members 53 and 54 have a length sufficient to extend at all times through the respective hoops 30 and 31 on rocking shaft 22 and to rest with their lower surfaces on that shaft. At a suitable distance from their rear ends, each locking member is provided with an inclined notch leading to an abrupt wall facing the rear end and adapted to abut against the shaft 22, when the tractor is moved rearwardly, as by being retracted during the loading operation. It will be understood that the arrangement is such that both members lock and unlock simultaneously.

For the purpose of unlocking the members, I provide means whereby this may be accomplished jointly with the tripping of bucket 13 and, as seen in Fig. 6, upon rocking of shaft 22 to the rear, latches 25 and 26 are disengaged from the rear of bucket 13 and at the same time their projections 27 and 28 contact the respective lower surfaces of locking members 53 and 54 lifting those members and disengaging their notches from contact with rocking shaft 22.

With the foregoing description in mind, it will be noted that a minimum of modification of a conventional tractor mounted front-end loader is required in the practice of my invention. The framework, grapple and locking means are formed of inexpensive materials; may be readily installed or removed, from the tractor loader; and require no appreciable effort on the part of the operator during their operation. This operation will be apparent from a consideration of Figs. 2, 3 and 4. Assuming that a thick layer of manure is to be loaded, the grapple is raised to the starting position of Fig. 2 by a pull on cable 55 and with the bucket 13 resting in engagement with the ground, or floor of a barn stall, for example. At this time the rocking shaft, due to the weight of its attachments, rests with latches 25 and 26 in engagement with the bucket 13 and with its projections 27 and 28 out of contact with locking members 53 and 54 which, in turn, have been previously unlocked from engagement with that shaft. The tractor is advanced to engage the bucket tines under the layer of manure and tension is then released upon cable 55, permitting the grapple to fall into engagement with the top of the layer of material, as seen in Fig. 3. Continued forward movement of the tractor causes the grapple to rotate about rod 49 as the several tines 44, 45, 46 and 47 become self-embedded in the material. During this rotation of the grapple, locking members 53 and 54 are pulled forward with respect to shaft 22 and when the grapple tines reach a substantially vertical position, as seen in Fig. 4, the notches in each of those members are in engagement with that shaft. Meanwhile, the coaction of the bucket and grapple tines has segregated a mass $M^1$ of material for subsequent lifting action by the loader.

After locking of the members 53 and 54 upon the rocking shaft 22, the operator then retracts the tractor, at which time the locking members are placed under compression due to engagement of the abrupt wall of their notches with shaft 22. Since these members are locked the grapple cannot rotate and thus the grapple tines embedded in the material cause a breaking away of the loaded mass $M^1$ from the residual mass M.

The operator then raises the bucket and attachment to an overhead position by actuation of piston rods 16 and 17 in known manner, and with the bucket and grapple still remaining in latched position. With the bucket in place above the manure spreader or other conveyance, the operator then pulls on cable 24, whereupon shaft 22 is rocked, disengaging the latches 25 and 26 from the bucket and permitting the bucket to tilt and to discharge the mass $M^1$ of material into the conveyance. As shaft 22 is rocked, the locking members are simultaneously unlocked as above described and slack appears in cable 55. This slack may conveniently be taken up by the operator and held until the bucket is again lowered to the ground and reengaged with latches 25 and 26 in preparation for the next loading of the bucket.

It thus will be noted that the attachment is operable by tractor movement and that the entire power furnished by the tractor is available in forcing the material into the bucket and in breaking away the segregated load of material.

In accordance with the patent statutes, I have described what at present is considered to be the preferred embodiment of my invention, but it will be obvious to those skilled in the art that various changes and modifications may be made therein without departing from the true spirit and scope of the invention and, I, therefore, aim to cover, in the appended claims, all such equivalent variations and modifications.

What I claim as new and desire to secure by Letters Patent of the United States is:

1. An attachment for a tractor-mounted front-end loader comprising a pair of transversely spaced longitudinal beams pivoted at their inner ends on said tractor and having a scoop-type bucket therebetween at their outer ends adapted for ground engagement, said attachment comprising a framework rigidly mounted upon said beams and projecting forwardly and upwardly of the outer ends thereof, a grapple pivotally mounted upon said framework for rocking movement between a starting position and a bucket loading position and having a plurality of downwardly extending tines for engaging the material to be loaded, said grapple being biased to move normally toward said bucket loading position the lower ends of said grapple tines after initial contact with said material being progressively moved closer to said bucket during continued forward movement of said tractor thereby to become securely embedded in said material, means for moving said grapple toward said starting position, a rocking shaft mounted from said beams, means for selectively moving said shaft between a grapple-locking position and a grapple-unlocking position, and grapple-locking means mounted upon said grapple and cooperating with said shaft for locking engagement therewith and disengagement therefrom, said grapple being movable by its engagement with said material jointly into said bucket loading position and into locking engagement during forward movement of said tractor and being retained therein during rearward movement of said tractor and prior to actuation of said shaft to unlocking position.

2. Apparatus as defined in claim 1 including means attached to said shaft for latching and unlatching said bucket and having a portion adapted to engage said grapple-locking means for moving the same to grapple-unlocking position simultaneously with unlatching of said bucket.

3. Apparatus as defined in claim 1 wherein said grapple comprises a transverse central member rigidly affixed to said tines and journalled in substantially counter-balanced relation upon said framework and a transverse upper member rigidly affixed to the upper ends of said tines and mounting said grapple locking means.

4. Apparatus as defined in claim 1, wherein said grapple-locking means comprises a plurality of elongated members having notches therein adapted to abut against said shaft during rearward movement of said tractor and to resist by compression thereof the force tending to rock said grapple during the breaking away of the segregated mass of material from the residual mass of material.

5. Apparatus as defined in claim 4 including, hoop means positioned on said shaft and encompassing said elongated grapple-locking members thereby to guide said members during rocking movement of said grapple.

6. A tractor mounted front end loader comprising a pair of transversely spaced longitudinal beams pivoted at their inner end upon said tractor and having a scoop-type bucket therebetween at their outer ends adapted for ground engagement, a plurality of tines attached to said scoop and adapted to move under the material to be loaded during forward movement of said tractor, a framework rigidly mounted on said beams and projecting forwardly and upwardly of the outer ends thereof, a grapple pivotally mounted upon said framework for rocking movement between a starting position and a bucket-loading position having a plurality of downwardly extending tines for engaging the material to be loaded, said grapple tines serving to hold material resting upon said bucket tines during rearward movement of said tractor and said grapple being biased to move normally toward said bucket loading position, the lower ends of said grapple tines after initial contact with said material being progressively moved closer to said bucket during continued forward movement of said tractor thereby to become securely embedded in said material, means for moving said grapple toward said starting position, said grapple tines being lifted from the region adjacent said bucket tines while in said starting position, a rocking shaft mounted upon said beams, means for selectively moving said shaft between a grapple-locking position and a grapple-unlocking position, and grapple-locking means mounted upon said grapple and cooperating with said shaft for locking engagement therewith and disengagement therefrom, said grapple being movable by the engagement of its tines with said material jointly into said bucket-loading position and into locking engagement during forward movement of said tractor and being retained therein during rearward movement of said tractor as the material held by said grapple and bucket tines is broken away from the remainder of said material.

7. In combination, a tractor having a front-end loader comprising a pair of transversely spaced longitudinal beams pivoted at their inner ends upon said tractor and having a scoop-type bucket therebetween at their outer ends for ground engagement, an attachment comprising a framework mounted upon said beams and projecting forwardly and upwardly of said outer ends thereof, a grapple pivotally mounted on said framework and having a plurality of tines depending therefrom for engagement with a quantity of material resting upon the ground in advance of said bucket, said grapple being mounted for embedding motion of the tines thereof during forward motion of said tractor, means attached to said grapple for selectively holding the tines thereof in a starting position out of contact with said material prior to loading of the same, and means for positioning said grapple tines into a bucket loading portion in engagement with said material, the lower ends of said grapple tines after initial contact with said material being progressively moved nearer to said bucket during continued forward motion of said tractor, thereby to become securely embedded in said material.

8. Apparatus as defined in claim 7 including means for releasably locking said pivoted grapple in loaded position and against reverse pivotal movement thereof when said grapple tines reach their position nearest said bucket.

References Cited in the file of this patent
UNITED STATES PATENTS

| | | |
|---|---|---|
| 1,013,755 | Elsasser | Jan. 2, 1912 |
| 2,501,243 | Snyder | Mar. 21, 1950 |